US008192266B2

(12) United States Patent
Alderucci et al.

(10) Patent No.: US 8,192,266 B2
(45) Date of Patent: Jun. 5, 2012

(54) MULTI-STAGE CARD SELECT

(75) Inventors: Dean P. Alderucci, New York, NY (US); Mark A. Miller, New York, NY (US)

(73) Assignee: CFPH, LLC, New York, NY (US)

( * ) Notice: Subject to any disclaimer, the term of this patent is extended or adjusted under 35 U.S.C. 154(b) by 590 days.

(21) Appl. No.: 12/252,488

(22) Filed: Oct. 16, 2008

(65) Prior Publication Data

US 2010/0099478 A1 Apr. 22, 2010

(51) Int. Cl.
*G06F 17/00* (2006.01)

(52) U.S. Cl. ........................................................ 463/11

(58) Field of Classification Search ................ 463/9–13, 463/16–25

See application file for complete search history.

(56) References Cited

U.S. PATENT DOCUMENTS

| | | | | |
|---|---|---|---|---|
| 4,266,770 | A | 5/1981 | Yeager | |
| 4,531,187 | A | 7/1985 | Uhland | |
| 4,926,327 | A | 5/1990 | Sidley | |
| 5,255,915 | A | 10/1993 | Miller | |
| 5,356,145 | A | 10/1994 | Verschoor | |
| 5,586,766 | A | 12/1996 | Forte et al. | |
| 5,605,334 | A | 2/1997 | McCrea, Jr. | |
| 5,630,753 | A | 5/1997 | Fuchs | |
| 5,707,287 | A | 1/1998 | McCrea, Jr. | |
| 5,803,808 | A | 9/1998 | Strisower | |
| 5,836,586 | A | 11/1998 | Marks et al. | |
| 5,851,147 | A | 12/1998 | Stupak et al. | |
| 5,941,769 | A | 8/1999 | Order | |
| 5,967,894 | A | 10/1999 | Kinoshita et al. | |
| 6,126,541 | A | 10/2000 | Fuchs | |
| 6,139,014 | A * | 10/2000 | Breeding et al. | 273/149 R |
| 6,217,447 | B1 | 4/2001 | Lofink et al. | |
| 6,386,973 | B1 | 5/2002 | Yoseloff | |
| 6,585,591 | B1 | 7/2003 | Baerlocher et al. | |
| 6,612,926 | B1 | 9/2003 | Dabrowski | |
| 6,663,487 | B1 | 12/2003 | Ladner | |
| 6,811,486 | B1 | 11/2004 | Luciano, Jr. | |
| 6,869,074 | B2 * | 3/2005 | Miller | 273/292 |
| 7,056,205 | B2 | 6/2006 | Odom | |
| 7,086,943 | B2 | 8/2006 | Mugnolo et al. | |
| 7,114,718 | B2 | 10/2006 | Grauzer et al. | |
| 7,182,690 | B2 | 2/2007 | Giobbi et al. | |
| 7,341,519 | B2 | 3/2008 | McMain et al. | |

(Continued)

OTHER PUBLICATIONS

"Baccarat—Learn to play like a professional with a unique free evaluation—Save Money", 4 pages; Accessed Oct. 13, 2008; http://web.archive.org/web/20010603045041/www.happyfortune.com/features.htm.

(Continued)

*Primary Examiner* — Ronald Laneau
(74) *Attorney, Agent, or Firm* — Mark A. Miller

(57) ABSTRACT

Embodiments related to conducting a wagering game according to the rules of a base game includes defining a finite set of game indicia. In some embodiments the player plays multiple sequential game hand by placing a wager, receiving game indicia from the finite set cumulatively excluding any game indicia previously dealt, playing the game hand to completion, collecting the game indicia from the player and excluding the dealt game indicia from further play, and displaying at least the excluded game indicia or any winning combinations precluded by the excluded game indicia. In some embodiments the game hands continue in sequence until a restoration event, which may include a manually triggered restoration or an automatic restoration event, that restores the excluded game indicia. Other embodiments are also described.

18 Claims, 2 Drawing Sheets

U.S. PATENT DOCUMENTS

| | | | | |
|---|---|---|---|---|
| 7,419,162 | B2 * | 9/2008 | Lancaster et al. | 273/292 |
| 7,425,178 | B1 | 9/2008 | Odom | |
| 7,431,648 | B2 * | 10/2008 | Odom et al. | 463/21 |
| 7,523,941 | B2 | 4/2009 | Thomas et al. | |
| 7,530,572 | B2 | 5/2009 | Thomas et al. | |
| 7,611,409 | B2 | 11/2009 | Muir et al. | |
| 7,717,429 | B2 | 5/2010 | Lutnick et al. | |
| 7,811,167 | B2 | 10/2010 | Giobbi et al. | |
| 7,914,369 | B2 | 3/2011 | Walker et al. | |
| 7,942,418 | B2 | 5/2011 | Amaitis et al. | |
| 2001/0035608 | A1 | 11/2001 | Hoyt et al. | |
| 2002/0068635 | A1 | 6/2002 | Hill | |
| 2002/0103017 | A1 | 8/2002 | Odom et al. | |
| 2002/0155872 | A1 | 10/2002 | Odom et al. | |
| 2002/0195773 | A1 * | 12/2002 | Dunn | 273/274 |
| 2003/0109310 | A1 | 6/2003 | Heaton et al. | |
| 2004/0082373 | A1 | 4/2004 | Cole et al. | |
| 2004/0142742 | A1 | 7/2004 | Schneider et al. | |
| 2005/0037834 | A1 | 2/2005 | Stern et al. | |
| 2005/0130728 | A1 | 6/2005 | Nguyen et al. | |
| 2005/0143158 | A1 | 6/2005 | Odom et al. | |
| 2005/0161882 | A1 * | 7/2005 | Miller | 273/274 |
| 2005/0181851 | A1 | 8/2005 | Amaitis et al. | |
| 2006/0079308 | A1 | 4/2006 | Asher et al. | |
| 2006/0183540 | A1 | 8/2006 | Grauzer et al. | |
| 2006/0189382 | A1 | 8/2006 | Muir et al. | |
| 2007/0054721 | A1 | 3/2007 | Jackson | |
| 2008/0054568 | A1 | 3/2008 | Lutnick et al. | |
| 2008/0067743 | A1 | 3/2008 | Naicker | |
| 2008/0090650 | A1 | 4/2008 | Tarantino | |
| 2008/0119257 | A1 | 5/2008 | Stern et al. | |
| 2008/0182644 | A1 | 7/2008 | Lutnick et al. | |
| 2010/0009737 | A1 | 1/2010 | Lutnick et al. | |
| 2010/0099477 | A1 | 4/2010 | Alderucci et al. | |
| 2010/0099479 | A1 | 4/2010 | Miller | |
| 2010/0099481 | A1 | 4/2010 | Alderucci et al. | |
| 2010/0105457 | A1 | 4/2010 | Miller | |
| 2010/0105458 | A1 | 4/2010 | Miller | |
| 2010/0105459 | A1 | 4/2010 | Miller | |
| 2010/0105461 | A1 | 4/2010 | Miller | |
| 2010/0105465 | A1 | 4/2010 | Miller | |
| 2010/0113119 | A1 | 5/2010 | Miller | |
| 2010/0113126 | A1 | 5/2010 | Miller | |
| 2010/0113137 | A1 | 5/2010 | Miller | |
| 2010/0120483 | A1 | 5/2010 | Lutnick et al. | |
| 2011/0180993 | A1 | 7/2011 | Amaitis et al. | |

OTHER PUBLICATIONS

"Casino Verite Blackjack History", 8 pages; Accessed Oct. 13, 2008; http://web.archive.org/web/20010819115538/www.qfit.com/cvhist.htm.
Blackjack Table Image, 1 page; Accessed Oct. 13, 2008; http://web.archive.org/web/20010414005535/www.qfit.com/cvssb1.htm.
"Counting Cards", 1 pages; Accessed Oct. 13, 2008; http://web.archive.org/web/20010715031334/www.casinosoftware.net/software/html/CC2Setup.zip.html.
"Deck of Cards.Java Programming Assignment"; 4 pages; Accessed Oct. 13, 2008 http://web.archive.org/web/20010418172543/www.cs.clemson.edu/~pargas/courses/cs241/current/assignments/spring2001/pl/DeckOfCards.html.
"Baccarat—Learn to play like a professional with a unique free evaluation—Features", 4 pages; Accessed Oct. 13, 2008 http://web.archive.org/web/20010603045041/www.happyfortune.com/features.htm.
U.S. Appl. No. 11/850,565, filed Sep. 5, 2007, Lutnick et al.
U.S. Appl. No. 11/669,996, filed Feb. 1, 2007, Lutnick et al.
U.S. Appl. No. 11/972,002, filed Jan. 10, 2008, Amaitis et al.
U.S. Appl. No. 12/169,383, filed Jul. 8, 2008, Lutnick et al.
U.S. Appl. No. 12/253,343, filed Oct. 17, 2008, Alderucci et al.
U.S. Appl. No. 12/254,485, filed Oct. 20, 2008, Alderucci et al.
U.S. Appl. No. 12/255,123, filed Oct. 21, 2008, Miller.
U.S. Appl. No. 12/256,634, filed Oct. 23, 2008, Miller.
U.S. Appl. No. 12/256,640, filed Oct. 23, 2008, Miller.
U.S. Appl. No. 12/257,649, filed Oct. 24, 2008, Miller.
U.S. Appl. No. 12/259,325, filed Oct. 28, 2008, Miller.
U.S. Appl. No. 12/259,330, filed Oct. 28, 2008, Miller.
U.S. Appl. No. 12/263,768, filed Nov. 3, 2008, Miller.
U.S. Appl. No. 12/263,779, filed Nov. 3, 2008, Miller.
U.S. Appl. No. 12/263,789, filed Nov. 3, 2008, Miller.
U.S. Appl. No. 12/688,422, filed Jan. 15, 2010, Lutnick et al.
Canadian Examiner's Report for Application No. 2,625,171 dated Oct. 7, 2009 (4 pages).
Notification of Transmittal of the International Search Report and Written Opinion for International Application No. PCT/US07/77646, dated Sep. 30, 2008 (11 pages).
International Preliminary Report on Patentability for International Application No. PCT/US07/77646, dated Mar. 10, 2009 (6 pages).
USPTO Office Action for U.S. Appl. No. 11/669,996; dated Feb. 17, 2009 (11 pages).
USPTO Examiner Interview Summary for U.S. Appl. No. 11/669,996; dated Jun. 17, 2009 (4 pages).
Olaf Vancura & Ken Fuchs, Knock-Out Blackjack, Sep. 1998, Huntington Press, 1st Edition, pp. 43-72.
Notification of Transmittal of the International Search Report and Written Opinion for International Application No. PCT/US08/52461, dated Jul. 8, 2008 (10 pages).
International Preliminary Report on Patentability for International Application No. PCT/US08/52461, dated Aug. 4, 2009 (6 pages).
Australian Examiner's Report for Australian Application No. 2008201369, dated Aug. 26, 2009 (2 pages).
Australian Examiner's Report for Australian Application No. 2007292385, dated May 28, 2010 (2 pages).
USPTO Examiner Interview Summary for U.S. Appl. No. 11/669,996; dated Nov. 23, 2009 (2 pages).
USPTO Notice of Allowance and Fees Due for U.S. Appl. No. 11/669,996; dated Nov. 23, 2009 (8 pages).
USPTO Office Action for U.S. Appl. No. 11/972,002, Mar. 19, 2010 (6 pages).
USPTO Supplemental Notice of Allowability for U.S. Appl. No. 11/669,996, Apr. 6, 2010 (4 pages).
USPTO Office Action for U.S. Appl. No. 11/972,002, Jun. 3, 2010 (8 pages).
USPTO Office Action for U.S. Appl. No. 12/688,422, dated Nov. 15, 2010 (7 pages).
USPTO Office Action for U.S. Appl. No. 11/972,002, dated Oct. 20, 2010 (6 pages).
USPTO Notice of Allowance and Fees Due and Examiner Interview Summary Record for U.S. Appl. No. 12/688,422, dated Aug. 12, 2011 (11 pages).
USPTO Office Action for U.S. Appl. No. 12/254,485, dated Oct. 7, 2011 (12 pages).
USPTO Office Action for U.S. Appl. No. 12/256,640, dated Sep. 19, 2011 (26 pages).
USPTO Office Action for U.S. Appl. No. 12/257,649, dated Jun. 24, 2011 (6 pages).
USPTO Office Action for U.S. Appl. No. 12/259,330, dated Oct. 4, 2011 (25 pages).
USPTO Office Action for U.S. Appl. No. 12/263,779, dated Jul. 22, 2011 (15 pages).
USPTO Office Action for U.S. Appl. No. 12/263,789, dated Sep. 20, 2011 (23 pages).
Canadian Examiner's Report for Application No. 2,662,856, dated Aug. 19, 2011 (3 pages).
U.S. Appl. No. 60/824,522, filed Sep. 5, 2006, Lutnick et al.
U.S. Appl. No. 60/824,648, filed Sep. 6, 2006, Lutnick et al.
USPTO Notice of Allowance and Fees Due for U.S. Appl. No. 11/972,002, dated Feb. 4, 2011 (7 pages).
USPTO Office Action for U.S. Appl. No. 12/169,383, dated Mar. 28, 2011 (11 pages).
Japanese Office Action with English Translation for Application No. 2009-518656, mailed Mar. 15, 2011 (6 pages).
USPTO Office Action for U.S. Appl. No. 12/255,123, dated Apr. 20, 2011 (6 pages).
USPTO Office Action for U.S. Appl. No. 12/256,634, dated Apr. 6, 2011 (8 pages).

USPTO Office Action for U.S. Appl. No. 12/259,325, dated Apr. 13, 2011 (8 pages).
USPTO Office Action for U.S. Appl. No. 12/263,768, dated Apr. 25, 2011 (6 pages).
Australian Examiner's Report for Australian Application No. 2007292385, dated May 26, 2011 (3 pages).
USPTO Office Action for U.S. Appl. No. 11/850,565, dated May 12, 2011 (7 pages).
USPTO Office Action for U.S. Appl. No. 12/253,343, dated Oct. 12, 2011 (11 pages).
USPTO Notice of Allowance and Fees Due for U.S. Appl. No. 12/256,634, dated Nov. 7, 2011 (5 pages).
USPTO Office Action for U.S. Appl. No. 12/259,325, dated Nov. 21, 2011 (6 pages).
USPTO Office Action for U.S. Appl. No. 11/850,565, dated Dec. 27, 2011 (14 pages).
USPTO Office Action for U.S. Appl. No. 13/081,787, dated Jan. 30, 2012 (6 pages).
USPTO Notice of Allowance and Fees Due for U.S. Appl. No. 12/263,768, dated Dec. 5, 2011 (5 pages).
Australian Examiner's Report for Australian Application No. 2007292385, dated Dec. 7, 2011 (3 pages).

* cited by examiner

MULTI-STAGE CARD SELECT

DESCRIPTION

Figure 1:
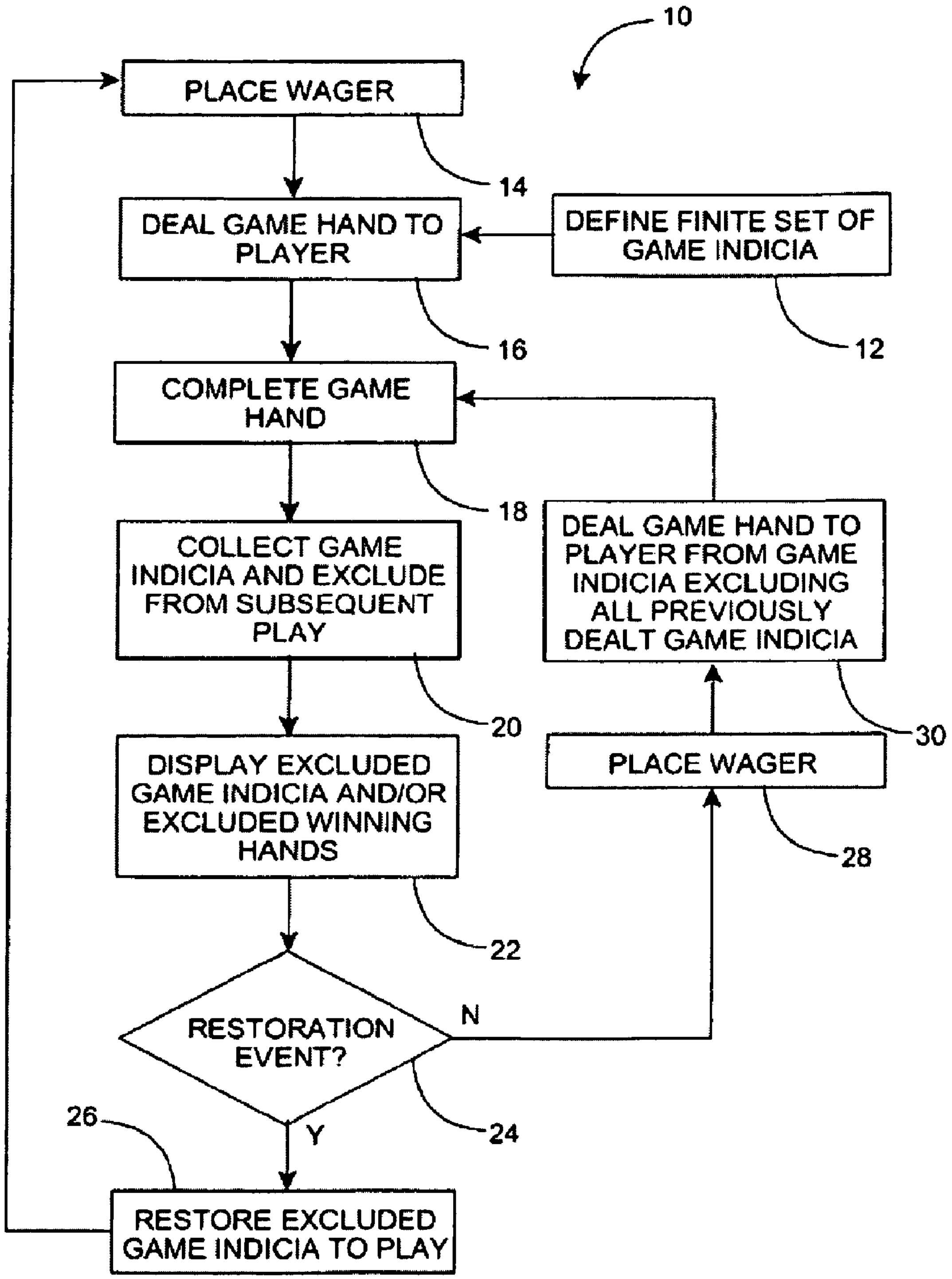
FIG. 1 is a flow chart of a method according to an embodiment of the present invention directed to multiple sequential game hands.

U.S. patent application Ser. No. 09/977,138 entitled "Electronic Card Game and Method," filed Oct. 12, 2001, U.S. Provisional Application Ser. No. 60/241,644 entitled "Electronic Video Poker Game and Method," filed Oct. 19, 2000, U.S. patent application Ser. No. 09/942,520 entitled "Live And Electronic Wagering And Lottery Game," filed Aug. 29, 2001, U.S. Provisional Application Ser. No. 60/229,665 entitled "Live and Electronic Wagering and Lottery Game," filed Aug. 31, 2000, and U.S. patent application Ser. No. 11/007,108, entitled "Method of conducting a wagering game with continuous depletion," filed Dec. 7, 2004 are all hereby incorporated herein by reference.

Embodiments of the present invention relate to games. Some embodiments relate to a method for conducting multiple hands of a game. In some implementations, a game may involve a single finite game indicia set that cumulatively excludes game indicia previously dealt until a restoration event occurs.

There are many known casino games that use indicia to determine the outcome of the game. For example, many casino games of chance utilize reels displaying a fixed set of award symbols. These reel games are commonly referred to as reel slot machines or slot machines.

Slot machines can contain any number of reels, although most slot machines contain three, four, or five reels, and any number of pay lines, although most slot machines include one, three, five, eight, or nine pay lines. Each reel on a slot machine may index at a plurality of positions or stops, each of which contains a symbol or a blank. The number and location of index positions can vary depending upon the model type of each game but all instances, are fixed. These model types are determined by a variety of award tables and corresponding combinations of reel symbols. As noted above, the combination of symbols displayed when the reels index determines whether the player has won or lost.

The player may place a wager to initiate play of a slot machine. In some implementations, the player can place multiple wagers to, as described previously, increase the payout amounts, increase the number of active pay lines, or both. Often, the specific wagering structure dictates the allocation of multiple coin wagers. The reels may be randomized, i.e. mechanically or electronically "spun," and the combinations of reel symbols index across the pay line or pay lines are examined for winning combinations. Winning combinations are rewarded according to the pay table which may take into account the size of the wager. Some implementations of video poker are well known (e.g., video draw poker, video stud poker, etc.). In some games of video draw poker, a gaming device is provided wherein the player makes a wager and the device's processor selects (e.g., from a data structure containing data representing cards in a deck of playing cards) five cards to be displayed face up to represent an initial hand. The player selects which, if any, of the five cards of the initial hand to hold and prompts the processor to discard the remaining cards. The discarded cards are replaced with replacements (e.g., selected from the data structure) to produce a final hand outcome of a five card poker hand. The video draw poker device may compare the final outcome to the predetermined winning combinations, which may also be stored in a data structure, these combinations frequently representing ranked poker hands. If the player's final outcome matches a winning combination, the player is rewarded. Otherwise, the final outcome may be deemed to be a loss and the player's wager may be retained.

In a variation of video draw poker, multiple hands may be provided. As with conventional video draw poker, the device's processor may randomly deal five cards to a player for an initial hand. The player may select which, if any, of the five cards of the initial hand to hold. Prior to drawing replacement cards for the initial hand, the held cards may be copied into the other hands. The player may prompt the processor to discard the remaining cards and additional cards may be drawn to replace the discarded cards. The processor may then repeat the draw step for the additional hands. Thus, a player receives multiple opportunities to draw to the same held cards.

Blackjack is a well known card game played in casinos. The object of the game is to have a final hand total closer to twenty-one than the dealer's hand without exceeding twenty-one. For purposes of calculating the final hand total, each card has a value equal to its face value except face cards, which have a value of ten, and aces, which may have a value of eleven or one as the player selects or as required to prevent the player from exceeding twenty-one. In conventional Blackjack, the suit of the cards is not relevant to the outcome of the game.

The form of Blackjack played in some casinos is played between a dealer, representing the house, and at least one player. In a typical Blackjack game, each player makes a wager in a wagering area on a playing surface. The dealer deals two cards to each player and two cards, one card face up and the other face down, to himself or herself. Any player receiving a natural twenty-one or Blackjack, i.e. a total of twenty-one in the initial dealt hand, is immediately rewarded, typically at a rate of 2:1 or 3:2, and play is terminated as to that player. Each remaining player examines his or her hand and decides whether to hit, i.e. receive another card, or stand, i.e. receive no further cards and finish play with the player's current hand. A player may hit as many times as the player wishes as long as the player does not bust, i.e. have a cumulative total greater than twenty-one. When a player busts, that player's wager is immediately collected and play is terminated as to that player.

A player may also have additional options available depending on the initial hand dealt and the house rules. For example, a player may have the option of "doubling down." Although the availability of the double down option varies depending on each casino's house rules, the option allows a player to double the player's wager in exchange for a single additional card. Some house rules permit doubling down on initial hand totals of ten or eleven only, other house rules permit doubling down on any initial hand total.

Another option available to a player is the option of "splitting." If a player receives a pair, i.e. two cards having the same face value, in his initial hand, most house rules permit the player to split the pair and use each card as a basis for a separate hand. For example, if a player is dealt a pair of eights, the player may choose to split the pair and continue play with two hands each having an eight and an additional dealt card as an initial hand. Each of those individual hands is then played independently by hitting, standing, or, under some house rules, doubling down or further splitting.

After all the players have played their hands, the dealer reveals the face-down card in the dealer's hand and completes the dealer's hand according to established house rules. That is, the casino uses established rules to eliminate the dealer's discretion. The dealer hits or stands as the house rules dictate, and resolves the wagers. In resolving the wagers, players with a final hand total closer to twenty-one than the dealer's final hand total are rewarded at even money. Conversely, wagers are collected from players with a final hand total further from twenty-one than the dealer's final hand total. If the dealer busts, all players who did not bust or receive a Blackjack are rewarded at even money. If the player and dealer push, i.e. have the same final hand total, the player's wager is returned.

Some players may believe that a drawback to any of these games is that they are well known and may provide little suspense in play. That is, as a player plays, the game is static. Each game is a separate trial using the same base set of symbols. Additionally, while many different types of bonus pay outs have been created, some players may desire bonus pay outs created in which the likelihood of obtaining the payout increases with additional play.

It should be recognized that any game or set of games may be played in a live, electronic and/or any other version.

Some embodiments of the present invention include a method for conducting a wagering game. The method can be applied to any base game using a set of game indicia. The base game includes, but is not limited to, games in which a player plays the game indicia originally dealt, such as slot machines, lotto, Bingo, stud poker, or the like; games in which players obtain additional game indicia during the game (either at the player's option or automatically), such as Blackjack or twenty-one and poker; and games in which a player may opt to discard and replace game indicia, such as draw poker. The present method may also be applied to single player or multi-player games.

In some embodiments, a finite set of game indicia are defined. Optionally, the finite set of game indicia are ordered. Some methods can be thought of as a multi-hand game. In one optional embodiment, the game hands are dealt sequentially; in an alternate embodiment, the game hands are dealt simultaneously. In either case, the player may place a wager for a game hand and game indicia are dealt to the player from the finite set cumulatively excluding all game indicia dealt in previous game hands, if any. The player plays the game hand to completion according to the base game. A determination is made whether the game hand forms a winning hand according to the base game. In one optional embodiment, this determination may be made by comparing the game hand to a schedule of game hands. In another optional embodiment, this determination may be made by comparing the game hand to one or more other player's and/or dealer's game hands.

In some embodiments, game indicia dealt are collected and, along with all game indicia dealt in previous game hands, are excluded from play in a subsequent game hand. At least one of (1) the inventory of the game indicia from the finite set cumulatively excluding all game indicia dealt in previous game hands or (2) winning hands including one or more excluded game indicia is displayed to the player. Optionally, both may be displayed.

In an optional embodiment in which multiple game hands are dealt simultaneously, the process is repeated for each game hand. Optionally, the player may be allowed to select the order in which game hands are conducted.

In an optional embodiment in which multiple game hands are dealt sequentially, the process is repeated for additional sequential game hands. Specifically, the steps of placing a wager, dealing game indicia, completing a game hand, collecting and excluding dealt game indicia, and displaying the game indicia inventory and/or the winning hands eliminated by the exclusion of game indicia, are repeated until a restoration event.

In some embodiments, the restoration event may include at least a manual restoration event, such as a player triggered restoration. In an optional multi-player embodiment, only one player may be eligible to trigger a manual restoration event on any game hand. Optionally, the restoration event may also include an automatic restoration event, such as the dealing of a quantity of game indicia or the conducting of a quantity of game hands. In a further optional embodiment, the restoration event includes a manual restoration event and an automatic restoration event, whichever occurs first. Upon a restoration event, excluded game indicia are restored to the finite set. In an optional embodiment in which the finite set is ordered, a restoration event also causes a reordering of the finite set.

In an optional embodiment, the player is restricted from placing a greater wager and/or altering the denomination of the wager in the additional sequential game hands. That is, in such an optional embodiment, the player may only change the wager size and/or denomination immediately following a restoration event.

In an optional embodiment directed to multi-denomination wagering, a plurality of wager denominations are defined. The game hand history is separately tracked for play at each wager denomination.

It should be recognized that all embodiments are optional whether or not they are specifically referred to as optional. A description of an embodiment is a description of an example that may or may not be included in some methods and/or apparatus.

Figure 2:
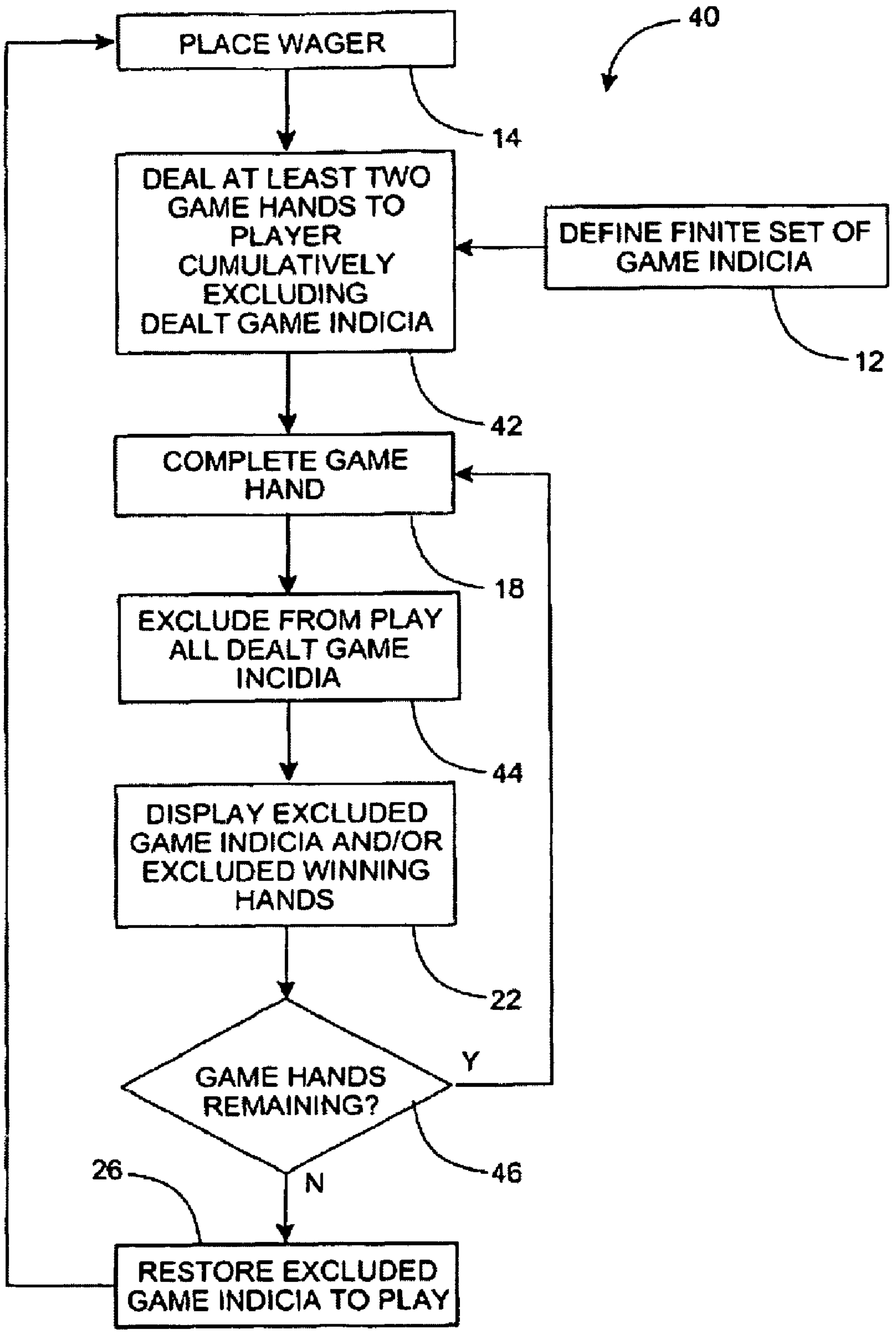
FIG. 2 is a flow chart of a method according to an embodiment of the present invention directed to multiple simultaneous game hands.

Reference is now made to the figures wherein like parts are referred to by like numerals throughout. As shown in FIGS. 1 and 2, some embodiments of the present invention include a method 10 for conducting a wagering game. Various methods could be implemented in a gaming machine, live game, conducted via computer network or Internet, or implemented in any other form.

Some methods are directed for use in combination with a base game. The base game may be a pre-existing base game or may be based on a pre-existing base game. Alternatively, the base game may be different from existing games. Among other purposes, the base game rules serve to guide the steps for completing a game hand and determining whether a game hand is a winning hand.

In this regard, it is noted that various methods could be used in conjunction with any base game. For example, the base game may include rules for the completion of a game hand in which a player plays the game indicia dealt, such as in a slot game, lotto, Bingo, stud poker game, or the like. Similarly, the base game may include rules for the completion of a game hand in which a player receives additional game indicia, either automatically or at the player's option, such as in Blackjack or twenty-one, Baccarat, or the like. Additionally, the base game may include rules for the completion of a game hand in which a player may discard and replace game indicia, such as in draw poker or the like. Examples of such games are given below. It is noted that these examples merely illustrate how various methods could be applied to various base games and should not be considered restrictive, since methods could be adapted to any other base game.

The base game rules may also vary according to the rules determining whether a game hand is a winning hand. Various methods could be applied to any base game without regard to how a winning hand is determined. For example, the base game rules may include determining a winning hand by comparing the game hand to a standard, such as a pay table. Similarly, the base game rules may include determining a winning hand by comparing the game hand to a dealer's hand, or one or more player's hand.

The base game may include single player or multi-player games. While various methods could be conducted the same whether a single player or multiple players are playing, in an optional embodiment directed to multi-player games, an optional rule could be implemented in which only one player is eligible to cause a manual restoration event during any game hand. As discussed in greater detail below, the eligibility may rotate among the players in such an optional embodiment.

Method 10 could be implemented for multiple sequential game hands, such as shown in the optional embodiment of FIG. 1, or for multiple simultaneous game hands, such as the method 40 shown in the optional embodiment of FIG. 2. Turning first to FIG. 1, the example embodiment includes defining 12 a finite set of game indicia. The game indicia may take any form including, but not limited to, playing cards, numbers, Bingo numbers, slot reel symbols, slot reel stops, or any other indicia. The finite set may include any quantity of game indicia, may include repeated game indicia, and may include multiple "sets" of game indicia, such as multiple decks of cards. That is, by "finite" it is intended that the finite set be closed so that exclusion or depletion, as described below, can occur.

Referring generally to FIGS. 1 and 2, the player places 14 a wager. In an embodiment directed to multiple sequential game hands, as shown in FIG. 1, the player places a wager for each game hand. Optionally, the wager may be controlled in that the player's options for altering a wager and/or wager denomination between restoration events may be limited. This is described in greater detail below. In an embodiment directed to multiple simultaneous game hands, as shown in FIG. 2, the present method may require only a single wager for participation or may require a separate wager for each game hand.

Returning to FIG. 1, a game hand is dealt 16 to the player. By "dealt" it is meant that game indicia are assigned to a player. In this regard, it is intended that slot reel symbols, Bingo numbers, lotto numbers, Keno numbers, playing cards, or any other game indicia may be "dealt." In the initial game hand, i.e. a game hand dealt 16 immediately after a restoration event, the game indicia may be dealt from a complete finite set in some embodiments. In subsequent game hands, discussed in greater detail below, the game indicia may be dealt 30 from the finite set excluding previously dealt game indicia in some embodiments. That is, after a game indicia is dealt it may be excluded from subsequent play until a restoration event in some embodiments. For example, in an embodiment in which the finite set is a single deck of playing cards, a dealt game hand of K heart 9.diamond 10.diamond. 3 club 7 hearts would mean that these cards are depleted from the finite set and, thus, there are no King of hearts, nine of diamonds, ten of diamonds, three of clubs, or seven of hearts available in the single deck inventory from which subsequent game hands will be dealt until a restoration event. It should be recognized that such depletion and finite sets may not be included in all embodiments, and/or other methods may be used, as described in more detail below.

With continued reference to FIG. 1, the player may play 18 the game hand to completion according to the rules of the base game. As discussed above, the precise base game can vary and, in fact, it is contemplated that embodiments of the present invention could be applied to any base game. Once the game hand is completed, the game hand may be assessed to determine whether the game hand is a winning hand and whether the player is entitled to an award.

In some embodiments, the game indicia of the game hand are collected 20, i.e. removed from play. That is, the player does not carry any of the game indicia to the next game hand in some such embodiments—in this sense, each game hand is separate because each game hand is separately dealt. Additionally, all dealt game indicia are excluded from further from play in a subsequent hand until a restoration event in some embodiments. This "exclusion" of game indicia dealt may allow the depletion of game indicia, optionally down to zero, from the universe of game indicia that can be dealt in a subsequent game hand. That is, with dealt game indicia excluded from subsequent play, the total inventory of game indicia is reduced and the inventory of the specific game indicia dealt is reduced, and may reach a zero balance, thereby reducing or eliminating the possibility that a game indicium will be dealt in a subsequent play in some embodiments. This, in turn, could eliminate certain winning hands from being dealt. For example, in a game using one deck of playing cards, if a player is dealt four Jacks in a game hand then a Royal Flush, i.e. a straight flush of ten through Ace, has been eliminated from subsequent hands by the depletion to zero inventory of the Jacks, unless a restoration event occurs.

In some embodiments, the results of the exclusion of dealt game indicia is available to the player by displaying 22 the constitution of the finite set excluding the dealt game indicia (or conversely by displaying the dealt game indicia), by displaying 22 the winning hands eliminated as a result of the exclusion of dealt game indicia (or conversely by displaying only the winning hands that can still be dealt), or both. As mentioned above, other embodiments may not include a finite set or excluding as described so far and/or may include other methods. Such alternatives are discussed below.

In some embodiments, additional game hands are conducted with the player placing 28 a wager, receiving a game hand of game indicia, and playing the game hand to completion. As noted above, these additional game hands may be dealt 30 from the finite set excluding any previously dealt game indicia in some embodiments. As each additional game hand is completed, the dealt game indicia from the additional game hands may be removed from play, e.g. collected from the player, and excluded from the inventory of game indicia available for subsequent game hands in some embodiments. As above, the results of the exclusion are displayed to the player in some embodiments.

It is noted that in an optional embodiment, the size of the wager in the additional game hands may be controlled. For example, the player may be restricted in the amount by which the player can increase the wager. That is, in an optional embodiment, the bet spread, i.e. the spread between the minimum wager and the maximum wager, may be different in the additional game hands than in a hand played with the full finite set of game indicia. In a further optional embodiment, not permitted to increase the wager at all during the additional game hands. Rather, the player of such an optional embodiment would only be permitted to increase the player's wager in a game following a restoration event. In other words, in such an embodiment, a player may increase the player's wager only when the finite set is restored of all the excluded game indicia.

In this regard, it is also contemplated that various methods may be adapted to a game in which multiple wager denominations are established. In an optional embodiment of such a multi-denomination game, the player may be restricted in changing denominations in that the player of such an optional embodiment would only be permitted to change the player's wager denomination in a game following a restoration event. That is, as above, in such an optional embodiment a player may change wager denomination only in some circumstances, such as when the full finite set of game indicia is available in some embodiments. One purpose of such optional wager and wager denomination restrictions are to control the house edge as additional game indicia are excluded from play in some embodiments, or other circumstances regarding a deck are changed in some embodiments.

As an example, in one optional embodiment, a player is enabled to place a wager of anywhere from one to five hundred credits without allowing players too great an ability to reduce the house edge. This is accomplished in this optional embodiment by dividing the wagers into wager denomination levels in which the maximum wager in any one wager denomination level is a predetermined multiple of the minimum wager. The multiple could depend upon the specific game; for example, in a Blackjack-type game, the multiple could be two, in other games, the multiple could be five. Thus, a first wager denomination level is one credit to five credits, a second wager denomination level is five credits to twenty-five credits, a third wager denomination level is ten credits to fifty credits, a fourth wager denomination level is twenty-five credits to one hundred twenty-five credits, and a fifth wager denomination level is one hundred credits to five hundred credits. Thus, a player is permitted to wager anywhere from one to five hundred credits, or at discrete plateaus therein, but may need to change wager denomination to do so.

According to some embodiments, the inventory may be restored or reshuffled to a full contingency before a player can increase the wager denomination. For instance, if a player is playing five credits per hand then wishes to raise the wager to one hundred credits per hand, the player cannot do so at the current wager level which would, at most, permit a wager of twenty-five credits per hand. Thus, the player in such an example, would need to change wager denomination to place a wager of one hundred credits per hand. As noted, a change in wager denomination would, in this optional embodiment, be allowed if the player triggers a manual restoration event, i.e. restores the game indicia to the full finite set. It should be understood that other embodiments may not include shuffling, finite sets, and/or may include any other methods.

Returning to the optional embodiment of FIG. 1, the additional game hands are dealt until a restoration event 24. The restoration event 24 may include a manual restoration event alone or in combination with an automatic restoration event in some embodiments. It should be recognized that such restoration events may not be included in some embodiments and may take any form in other embodiments. In one optional embodiment, both a manual restoration event and an automatic restoration event are provided, and the restoration occurs based on whichever occurs first. For example, a manual restoration event may include the player triggering a restoration. Similarly, the automatic restoration event may include the dealing of a predetermined quantity of game indicia and/or the conducting of a predetermined quantity of game hands. Thus, in an embodiment in which both manual and automatic restoration events are permitted, the player may trigger a restoration or may wait until a restoration automatically occurs after a certain quantity of game indicia are dealt and/or a certain quantity of game hands are conducted.

In an optional embodiment directed for use in a multi-player game, each player may be able to manually trigger a restoration. However, in another optional embodiment for multi-player games, only one player is eligible to manually trigger a restoration on any game hand. In a further optional embodiment, the eligibility to manually trigger a restoration rotates among the players.

In some embodiments, upon a restoration event, the excluded game indicia are restored 26 to the set of game indicia available for play. In other words, the full finite set of game indicia are available in a game hand dealt immediately after a restoration event. Optionally, in games in which the finite set is ordered, and game hands are dealt from the ordered finite set, a restoration event may optionally restore excluded game indicia and reorder the finite set. It should be recognized that other embodiments may not include a finite set, may not include restoration events, may not include a set of indicia, and/or may include any other method.

According to an optional embodiment of the present method, it may be desirable to track game hands to maintain a history of the game indicia available, i.e. the state of depletion, and the game hands dealt. In a multi-denomination embodiment of the present invention, the game history may be separately tracked and stored for each wager denomination plus the total games history of a machine.

The optional embodiment of FIG. 2 is one possible version of the present method 40 applied to a game in which multiple, i.e. at least two, simultaneous game hands are dealt. That is, in the embodiment of FIG. 2, rather than dealing game hands sequentially from a continuously depleted set of game indicia, the game hands are dealt simultaneously from a continuously depleted set of game indicia.

As described in some embodiments above, a finite set of game indicia may be defined 12. In such an optional embodiment, the player places 14 a wager and multiple game hands are simultaneously dealt 42 to a player. In this optional embodiment, the multiple game hands are dealt 42 from the finite set of game indicia. The game hands are played 18 to completion. Optionally, the player may choose the order in which the game hands are completed. Alternatively, the player may follow a predefined order in playing the game hands. As the player completes each game hand, the game indicia of the dealt hands along with any additional game indicia dealt to a game hand may be excluded 44 from the game indicia available in completing another game hand in some embodiments. That is, throughout the conduct of the method, the available game indicia are depleted by the game indicia dealt in some embodiments. At least the game indicia inventory or the winning hands excluded by the depletion are displayed 22 to the player in some embodiments. The process is repeated until there are no game hands remaining 46. After all the game hands are completed, the excluded game indicia are restored 26 for the next subsequent deal in some embodiments.

Below are given some examples of games and possible methods for resolving whether a game hand is a winning hand. It is specifically noted that these games are merely examples and should be considered neither limiting to the present method nor the only possible applications of the present method.

Numbers, Lotto, or Bingo-Type Games

This optional game may be played in a live or electronic version. In some embodiments, the game may be played with an inventory of game indicia. The game indicia may take many different forms, but in an optional embodiment, a fully constituted inventory consists of indicia between the numbers of 30 and 500 simulated symbols or live balls. For the purpose of explaining this optional embodiment of the game, the term "cage" refers to the location of the inventory of game indicia and the word "ball(s)" to refer to the game indicia available for dealing, even though it is contemplated that the game may be electronic in nature and there may be no physical “cage” or “ball(s)” but rather electronic representations thereof or no such elements at all.

In an example game, the cage is loaded with 63 balls and is continually spun and mixed by a random number generator (“RNG”) until the first ball is drawn, similar to Bingo. Some of the ball symbols have numbers on them and the others are just blank. Each game version may have one or more duplicate game indicia. One example of the cage inventory may be:

1

| Ball Symbol | Number of Balls |
|---|---|
| 7 | 3 |
| 11 | 5 |
| 1 | 15 |
| 2 | 9 |
| 3 | 7 |
| Blanks | 24 |

In this example embodiment, when a player activates the “Play” button on the electronic game embodiment with a fully constituted cage inventory of balls, i.e. the complete finite set of game indicia, the RNG selects the first ball symbol and continues to select a ball until the first game play is complete. In this optional embodiment, the screen has an array of three rows of three spaces each for a total of nine spaces for the selected balls. Thus, in such an optional embodiment, a player has a choice to wager on anywhere between one pay line and eight pay lines, i.e. any of the three horizontal rows, three vertical columns, or two diagonals. A winning combination may be obtained if three matching game indicia line up in a row, column, or diagonal. Example of a pay table:

2

| Symbol Combination | 1 Unit Bet | 2 Units Bet | 3 Units Bet | 4 Units Bet | 5 Units Bet |
|---|---|---|---|---|---|
| 7’s | 2,000 | 4,000 | 6,000 | 8,000 | 10,000 |
| 11’s | 200 | 400 | 600 | 800 | 1,000 |
| Any 7 or 11’s | 50 | 100 | 150 | 200 | 250 |
| 3’s | 50 | 100 | 150 | 200 | 250 |
| 2’s | 20 | 40 | 60 | 80 | 100 |
| 1’s | 10 | 20 | 30 | 40 | 50 |
| Any 1, 2 or 3’s | 5 | 10 | 15 | 20 | 25 |
| Blanks | 1 | 2 | 3 | 4 | 5 |

In this example embodiments, game indicia are depleted from the cage as each ball is drawn out of the game indicia cage inventory. In an optional embodiment, the first 3 balls called are for the center horizontal row of spaces first, then the other balls are called to fill the remaining rows one at a time until nine balls are selected. As each ball symbol is selected to form a play line, it is deleted from the respective indicia symbol inventory stored in the cage. Indicia depletion from the cage not only reduces the total inventory, but each separate group of symbols (numbered balls) may go to a zero balance and not be available for the next depleted portion of the game.

In this optional embodiment, a player may deplete up to fifty-four balls from the cage before an automatic restoration event. In such an optional embodiment, this equates to six complete game hands from a fully constituted cage, before the cage is automatically restored with the previously excluded inventory. The precise point of restoring the inventory will vary between versions, but factors that may be considered in triggering an automatic restoration could include the house edge in the game and any regulatory requirements regarding the minimum and maximum pay outs. Nonetheless, certain win combinations of indicia may be impossible to obtain as the inventory is depleted and, in this optional embodiment, these are displayed to the player. That is, when an indicia symbol or combination of symbols that can form a winning combination of a listed payout is excluded from the game indicia available prior to the start of new round or game, the player will be notified. In this optional embodiment, players are also informed of the remaining cage inventory after at least one round of game has been played, so the player has available the information to play based upon the depletion.

The present optional embodiment may also include a manual restoration event. That is, a player may have the ability to restore at will the excluded game indicia to the inventory. In this optional embodiment, the player may use a “Restore” button to control the point of playing with depleted inventory and the associated reduced or deleted winning combination pay outs.

In this example embodiment, the distinction between the automatic restoration event and the manual restoration event is that a player has no control or input in the automatic restoring point. Rather, in this optional embodiment, the excluded game indicia are automatically restored after a certain amount of game indicia has been drawn. However, using the manual restoration event, in this case the “Restore” button, a player can control the early restoring of the cage anytime after a game hand is completed.

In an optional embodiment, the “Restore” button may also be used to alter the sequence of any new numbers being selected from a full cage if pressed before the “Play” button is pressed. In such an optional embodiment, the RNG that controls the mixing and selection of game indicia is clock operated, and by utilizing the “Restore” button, it alters the timing position of the clock. In other words, if a player were to use the “Restore” button before pressing the “Play” button, the sequence of selected numbers would be different than if the “Play” button was used first. Thus, this optional embodiment allows players the ability have some input into the selection process of the RNG. For example, in U.S. Pat. No. 6,581,935, which is hereby incorporated by reference, an embodiment is described in which actuating a “Restore” button before a “Play” button alters the clock of a clock-based RNG thereby providing a different seed for randomly selecting game indicia.

In this example embodiment, a skill factor of knowing when the optimum time to call for an early restoration of the cage inventory based upon depletion and remaining symbol indicia may be beneficial. Proper use of the “Restore” button may add to the expected value payout of the game. The optimal play strategy of restoring the inventory at the precise time relative to the possible remaining is not always apparent, and players will have to develop a feel or skill for when to do this.

In an optional embodiment, this example game may be played with multiple wager denominations without changing pay outs in the pay tables or game indicia inventory. This is distinguished from many of the other video games which either change the pay tables or adjust the symbol mapping hit frequency (by adding or subtracting stops), to keep the casino daily hold amount about the same for all the denominations of play on a specific game. The bet spread limit on any round or game is between one and five credit units of a specified denomination. This optional embodiment permits varying sized wagers on each round or game, with the wager spread controlled by requiring the players to manually restore the cage inventory before changing wager denomination.

In this optional example, play history is separately tracked for each wager denomination. In such an optional embodiment, the history for any particular wager denomination is tracked since the exclusion of dealt game indicia makes each game unique. Thus, in an optional embodiment of such a gaming machine, having five or six wager denominations, the play history is separately tracked for each of five or six, respectively, wager denominations. While the information tracked may vary, in this optional embodiment, information such as the game indicia dealt, amount bet, amount paid out (if any), time, and date are tracked. Also, the amount of information tracked may vary, but in an optional embodiment, because a depletion game plays multiple game hands from a continually depleted inventory of game indicia, a record may be kept on the number of each game played from a full inventory (round 1, 2 etc.), thereby tracking the actual depletion of the inventory. This is distinguished from other video games, none of which plays more than one game, hand or round from a full inventory of indicia.

In an alternate optional embodiment directed to live play, a wire cage or blower contains five times the amount of inventory or three hundred fifteen balls that are selected nine at a time for up to six players at a specialized table. Up to five game hands are played before the cage is automatically restored. Pay outs may remain the same as electronic version. In this multi-player optional embodiment, the manual "Restore" button is passed from player to player each time the cage is restored.

Slot Machine Games

In another optional embodiment the depletion occurs in a video slot format. In a typical video or reel slot machine the symbols on the reels are not the actual stops. In such a typical machine, there may be anywhere from twenty-one to twenty-four symbols and blank spaces shown on each reel but there are actually anywhere from 220 to 370 stops for each reel that is mapped to the reel symbols. For a typical slot machine with twenty-two reel symbols/blank stops on each reel, this equates to over 10,000,000 possible combinations.

In this optional embodiment, the actual number of symbol stops are displayed for the reels in each of the reel inventory storage areas. The game initiates just like a slot machine and stops each reel wherever the random number generator instructs it to after the number has been selected.

However, in accordance with some embodiments of the present invention, after each game hand, the displayed combination of symbols and/or blanks may be excluded from that reel's inventory for subsequent game hands. Thus, after the first game hand in which, for example, 220 stops on each reel were available, only 219 stops on each reel are available on a second game hand. The depletion reduces the total combinations possible each time a stop is removed thus increasing the probability for a player to hit a jackpot. As above, this optional embodiment includes an automatic restoration event such that a certain amount of stops will always be left in the inventory when the automatic restoration of the excluded game indicia, i.e. reel stops, occurs. Also, a manual restoration event such as a "Reload" button will allow a player to control the early restoration of the game indicia.

Poker-Type Games

Various embodiments may be applied to a poker-type game. For example, in one optional embodiment in which the base game is a standard Jacks or better video draw poker game, up to four game hands are dealt from a standard fifty-two card poker deck before an automatic restoration event. As known in the art, the player of such an optional embodiment plays to obtain a winning hand as listed on a pay table. Play starts when a player selects the wager denomination for betting and places a bet of between minimum and maximum credits for the first hand. When the deal button is pressed, a game hand, five cards in this optional embodiment, are dealt face up to the player. The player has the option to keep any or all of the cards by pushing the hold button under each card and drawing up to five cards to replace the discarded ones. The replacement cards are dealt from the deck depleted of the five initially dealt cards. The game hand, consisting of the held cards along with the replacement cards, has been completed at this point. If a player receives a winning hand, the player is rewarded according to a pay table.

In this optional embodiment, in playing the additional hands from the depleted deck, each game hand wager is between a minimum and maximum bet limit for the selected wager denomination. In this optional embodiment, to change the bet credit denomination, the deck must be restored to a full inventory. In this optional embodiment, the pay table is constant throughout the additional game hands. That is, even in hands in which dealt game indicia are excluded, the pay table of this optional embodiment does not change. In an optional embodiment, the pay table could be:

3

| Hand Combination | Payout |
| --- | --- |
| Royal Flush | 5,000 |
| Straight Flush | 500 |
| 4 of a Kind | 200 |
| Full House | 50 |
| Flush | 35 |
| Straight | 30 |
| 3 of a Kind | 10 |
| 2 Pair | 5 |
| Jack's or Better | 5 |

In this example embodiment, as each card is dealt out to form an initial playing hand, it is deleted or otherwise excluded from the deck inventory for subsequent play until a restoration event. According to some embodiments, each card in a standard poker deck is a separate symbol, having an attribute of one of four different suits (spades, diamonds, clubs and hearts) of one of thirteen different values. Thus, for example, there is only one Queen of hearts in a deck, but there are a total of four Queens in the same deck. If the Queen of hearts were dealt in the first hand after a restoration event, it would be impossible to obtain a heart Royal Flush or four-of-a-kind Queens in a subsequent hand because that Queen of hearts is now excluded from subsequent play until the deck is restored. All of the listed payout combinations are possible to obtain from a full deck, i.e. complete finite set, but if more than one hand is played, each card symbol is deleted from the deck inventory for future use until a restoration event. As above, card depletion from the deck may not only reduces the total inventory but, in an optional embodiment using a single deck with no duplicates, each separate card symbol goes to zero balance and may not available to be dealt to subsequent game hands until a restoration event.

In some embodiments, as discussed above, a manual restoration event can be triggered by the player. The "Reshuffle" button allows players to be in control of playing with a depleted inventory, and it becomes a player option on whether to restore the excluded game indicia after playing one, two, three, or four hands before, in this optional embodiment, the deck is automatically restored. It allows an individual the ability to play the game with any strategy of choice and places the burden of playing with depleted outcomes on the individual and not on the game. A skill factor of knowing when the optimum time in the deck penetration is to call for an early reshuffle may be used in this game unlike some other game. In an example embodiment for draw poker, proper use of this game function will add approximately ½ of a percent to the Expected Value Payout to players over a period of time. The optimal play strategy of reshuffling at the precise time relative to the possible remaining pay outs may not be apparent, and each player may develop a feel or skill of when to do this. Player error may be high in this area.

In some embodiments, there may be a difference between the "Reshuffle" button function and the automatic restoration of the deck inventory. In an optional embodiment directed to draw poker, the automatic restoration event could be optionally determined by the quantity of completed hands. In an optional embodiment drawn to stud poker games, the automatic restoration could be optionally determined by the quantity of hands conducted or the quantity of cards dealt.

In some embodiments, as discussed above, as each card symbol is played, it may be removed from the deck inventory and displayed to the player. As noted, in an optional embodiment using a single poker deck, each card is a separate individual symbol. Thus, as each card is played there may be a zero balance for the symbol in the remaining deck inventory. When a symbol or combination of symbols that can form a winning combination of a listed payout is deleted from the deck prior to the start of a new hand, a player of this optional embodiment is notified through the display so that the player can opt to restore or reshuffle the deck inventory. For example, the player of such an optional embodiment would be notified through the display of any winning hand, such as a Royal Flush or a pair of Jacks, that may be eliminated as a result of deck depletion. In this optional embodiment, the player is also informed through the display of the remaining deck inventory after at least one hand has been played.

In an optional embodiment of a multi-denomination version of such a poker-type game, the winning hands listed on the pay table are constant without regard to the wager denomination. This is unlike some other video poker games in which the pay tables change when a game is played with a low denomination wager to keep the average daily casino hold about the same for all denomination machines.

In an optional embodiment, a player may wager between the minimum wager up to five times the minimum wager in any wager denomination level. As above, if a player wants to change the wager denomination, the deck must be restored to a full inventory of cards. Play history may optionally be separately tracked for each wager denomination. As above, the recording history of a such an optional embodiment may include such information as a game hand number, i.e. an identification of the game hand in the series of game hands after a restoration event, and cards played, win, lose, bet amount, and the like for each game hand.

According to the optional embodiment described, the game is distinguished from known poker-type games in that a player may (1) play a hand in a way that will give the highest expected value considering the average weighted payout for all possible outcomes; (2) exercise the choice and control of when to reshuffle the depleted deck considering the possible remaining winning hands; and (3) adjust wagers and wager denomination to obtain optimal pay outs as the deck is depleted.

In yet another optional embodiment, a 4th hand bonus may be provided for the draw poker-type game described. That is, this optional embodiment is provided as a modification of the Jacks or better draw poker game. As above, the deck is automatically restored after four complete hands dealt from a single deck of fifty-two cards. According to the optional embodiment, a bonus payout occurs for certain holdings, such as a Royal Flush or a Straight Flush, that occur on the fourth game hand after a deck is restored and reordered. An example pay table could be:

4

| Combinations | Payout for Hands 1-3 | Payout for Hand 4 |
|---|---|---|
| Royal Flush | 4,000 | 8,000 |
| Straight Flush | 500 | 1,000 |
| 4 of a Kind | 200 | 200 |
| Full House | 45 | 45 |
| Flush | 35 | 35 |
| Straight | 25 | 25 |
| 3 of a Kind | 10 | 10 |
| 2 Pair | 5 | 5 |
| Jack's or Better | 5 | 5 |

Again, this optional embodiment may be distinguished from other games in that a bonus may be offered on a hand dealt from a depleted deck of cards in which there is a higher likelihood of obtaining a straight flush. Thus, the player must factor in the possibility of winning the bonus amount in formulating the player's strategy of manually restoring the deck.

In another optional embodiment directed to a stud poker-type game, a Joker card that can substitute for any other card, i.e. a wild card, is added to a conventional fifty-two card poker deck to give a finite set containing fifty-three cards. In this optional embodiment, up to ten complete game hands could be conducted before an automatic restoration event to replenishing the deck inventory of cards.

In the optional embodiment, a wager is placed and a game hand is played with five cards dealt out to the player, with four cards face up and one card face down. In such an optional embodiment, a player has the option to double his or her wager based upon deck depletion and the remaining cards. The final card is revealed and the player is rewarded according to a pay table if the game hand is a winning hand.

In some embodiments, as described above, a player may have the ability to trigger a manual restoration event to restore excluded game indicia and reorder the deck inventory anytime after a hand of play is completed.

This may distinguish the example embodiment from other stud poker-type games in that the player may develop a strategy to reshuffle the deck to obtain the most winning pay outs of optimal estimated value. For example, it is noted that in a single player, single deck optional embodiment of the present game, by reshuffling the deck after a Joker has been played, the joker (wild card) will tend to appear 3½ times more often than if the deck was not reshuffled and the deck not depleted past one hand of play. Player error may occur both in the proper time to double the bet and optimal time to reshuffle the deck early.

In another optional embodiment, this game may include a bonus payout for certain winning hands appearing in certain game hands after a restoration event. For example, in an optional embodiment, a double payout for a Royal Flush and Straight Flush may be provided if the game hand is acquired in the 7th or 8th game hand after a deck is restored. In this optional embodiment, an automatic restoration event may occur after eight game hands before there is an automatic restoration of the deck inventory. The bonus pay outs could affect the strategy for early reshuffling and the dependence of the wild card play.

In another optional embodiment a method could be applied to a multi-hand draw poker-type game. For example, in one optional embodiment that utilizes one deck of fifty-two poker playing cards, four game hands of five cards each are dealt out to the player after the wager denomination is selected and a wager is placed. Unlike other multi-hand poker games that merely duplicate the same hand, the game hands according to this optional embodiment are dealt simultaneously, rather than sequentially, and completed from a continually depleted deck. That is, in this optional embodiment, the player makes a hold selection on each of the four game hands and draws from the remaining cards in the deck to complete each game hand in rotation.

In this optional embodiment, all the game hands played are displayed as the other game hands are completed, so an additional display of the deck inventory may not be necessary. In this optional embodiment, the multiple game hands are dealt simultaneously, and the deck may be restored after each game of multiple hands. Thus, a player cannot reshuffle the deck or increase the bet as each game hand is completed.

In yet another optional multi-hand embodiment, four game hands of five cards each may be dealt simultaneously to a single player from a standard fifty-two card poker deck. Each game hand may have a bet limit determined by a minimum and maximum wager and may optionally require that a bet of at least one credit be placed on each of the four game hands before the deal. As above, the player's goal is to obtain winning hands based on a schedule of winning hands in a pay table.

In some embodiments, after the initial four game hands are dealt out, the player can select to hold any or all of the cards and draw to replace the discarded cards from the depleted deck inventory. Game hands must be played in rotation order from the first through the fourth hand. Since each game hand could require at most ten cards, only a maximum of forty cards would be depleted from the deck. If a player obtains a winning combination on any completed game hand, he or she is paid according to a pay table.

This optional embodiment may be distinguished from other video games by the application of the present method of dealing multiple hands, each requiring a separate wager, from a continuously depleted deck. Additionally, however, the optional embodiment may include a multi-hand pay table to take advantage of the present multi-hand method. An example of a pay table according to this optional embodiment could be:

5

| Combinations | Payout |
|---|---|
| 4 Royals on the deal | 1,000,000 credits |
| 4 Royals - any way | 100,000 credits |
| 3 Royals - any way | 50,000 credits |
| 2 Royals - any way | 20,000 credits |
| 1 - Royal Flush | 5,000 credits |
| 1 - Straight Flush | 500 credits |
| 1 - Four of Kind | 200 credits |
| 1 - Full House | 45 credits |
| 1 - Flush | 30 credits |
| 1 - Straight | 25 credits |

-continued

5

| Combinations | Payout |
|---|---|
| 1 - Three of a Kind | 10 credits |
| 1 - Two Pair | 5 credits |
| 1 - Jacks or Better | 5 credits |

This optional embodiment may not contain the ability for the player to manually trigger a restoration. Rather, excluded game indicia may be restored after the four simultaneously dealt game hands are completed. Optionally, a progressive linked bonus payout system may be implemented for this game.

In this optional embodiment, a display is included to inform a player of the game indicia or winning combinations that have been depleted to zero and, thus, are not available for play for each subsequent hand before the deck is restored to a full card inventory.

Blackjack-Type Games

Some embodiments may also be applied to Blackjack or Blackjack-type games. In an optional single player embodiment, one or more hands are played against a dealer's hand with the object being to obtain a player hand, the total of which is nearer to twenty-one than the dealer's hand total is, without exceeding twenty-one. As known in the art, in the present optional embodiment, the Aces count as either one or eleven, face cards (kings, queens and jacks) as ten, and the numbered cards as their face value.

In some embodiments, two cards are dealt face up to the player and two cards are dealt to the dealer, one face up and one face down, commonly known as the hole card. The dealer's hole card is displayed after the player completes the player's game hand. However, if the dealer's hand is a natural twenty-one, i.e. an ace and a ten-value card also known as Blackjack, in a version of the game that does not have the insurance option, then both cards of the dealer are displayed and the game hand is over. Conversely, if a player's first two cards are a natural twenty-one, or Blackjack, the player is typically paid greater than even money assuming the dealer does not also have a Blackjack. The precise award for a Blackjack could vary.

In some embodiments, if, after completing the game hand by hitting or standing, the total value of the player's game hand is closer to twenty-one than the dealer's hand, then the player will win and be paid, optionally at even money. Additional options, such as splitting and doubling down may also be made available to the player. If a player's cards total more than twenty-one, the player busts and the player loses the wager bet. If the player and dealer have the same hand totals of seventeen or more a push occurs and bets are returned.

In this optional embodiment, one or more fifty-two card standard poker decks may be used. In an optional embodiment, as many as eight decks or more may be used. In some embodiments as discussed above, multiple hands are played from the deck and dealt cards are excluded from further play until a restoration event. It should be recognized that other embodiments may not include finite decks, may not include such depletion, and/or may include any other methods.

In some embodiments, as each game indicia, i.e. playing card, is dealt to either a player hand or a dealer hand, it is displayed to the player and removed from the deck inventory. That is, each card in a conventional poker deck is a separate symbol and as each symbol is played there is a balance of zero for that symbol in the deck inventory. When a symbol or combination of symbols that can form a winning combination for a listed payout is not available as a consequence of the exclusion of dealt cards, a display notifies the player. Optionally, the player may manually restore or reshuffle the deck inventory if the player chooses to do so. For example, if, as a result of the depletion, the Blackjack combination is eliminated, a display is provided to the player.

In some embodiments, the player has the ability to manually trigger an early reshuffle of the deck inventory after any completed hand by utilizing the "Reshuffle" button function of the game. The example game may also be directed for use in a multi-player format. In such an embodiment, any player may be able to manually trigger a restoration or, in an optional embodiment, the ability to manually trigger a restoration may rotate among players.

In some embodiments, as discussed above, limits on the bet spread (i.e. the difference between the minimum and maximum wager) and the ability of the player to change wager denomination may apply. That is, in an optional embodiment, the player may be restricted from changing wager denomination except after excluded indicia are restored either manually or automatically.

In an optional embodiment, each player may play multiple game hands dealt simultaneously. That is, in such an optional embodiment, two or more hands are dealt to the player and one hand to the dealer.

In some embodiments, while the player may be required to complete the player's game hands in a particular sequence, in an optional embodiment, the player may select the order in which the hands are played. Thus, one strategy would be to use the display of the excluded cards, or alternatively the cards not excluded, the player may play the game hands in the order that optimizes the player's chance of obtaining a particular card. As above, a Blackjack is an automatic win for the player unless the dealer also has a blackjack hand. All hands lose if dealer has a Blackjack, except that if the player has one or more Blackjacks a push outcome may occur.

In some embodiments, as discussed above, cards may be dealt from the continuously depleted deck until an automatic restoration event or manual restoration event, whichever occurs first. In this optional embodiment, an automatic restoration occurs when a quantity of cards have been dealt. Additionally, the player may also manually trigger a restoration after the dealer hand is completed. It should be recognized that other embodiments may not include such finite sets, such depletion, and/or may include any other methods.

In a further optional embodiment, a bonus may be provided for occurrences over multiple game hands. For example, in one optional embodiment, three game hands may be dealt to the player and one hand to the dealer. In this optional embodiment, the player receives a bonus payout for multiple Blackjacks, such as three Blackjacks for the three simultaneously dealt player game hands. In another optional embodiment, a player may be dealt four game hands and a bonus may be provide for multiple Blackjacks, such as two, three, or four Blackjacks, in the four simultaneously dealt player game hands.

It is specifically noted that embodiments of the present invention is not limited to video gaming machine and computer, e.g. Internet, play. Rather, embodiments of the present invention may be applied to table games as well. According to an optional embodiment, a table version of the present invention may include an object placed in front of only one player on any game hand to represent a "Reshuffle" button. This "Reshuffle" button would allow only one player to manually trigger a restoration before an automatic restoration. Optionally, the "Reshuffle" button rotates each time the deck is restored, either manually or automatically.

It is further noted that in some embodiments, the quantity of-cards played before an automatic restoration can be significant. By utilizing a consistent automatic restoration point, a payout of any blackjack type game will have less risk that the house advantage will be too low or that the player will gain an advantage. For example, in a game using six-decks of playing cards, the automatic restoration point set at seventy-eight cards remaining gives an average casino hold of 2.42% over the long term. However, by setting the automatic restoration point at seventy-nine cards remaining, the average casino hold raises to 2.53% over the long term.

Thus, by controlling the automatic restoration point in some embodiments, along with the minimum and maximum wager spread and any limitations on changing wager denomination if desired, a Blackjack-type game can be created applying various embodiments that does not allow the player to have an advantage over the house. Thus, in an optional embodiment, the present invention includes the calculation of an automatic restoration point to minimize the risk that the player will gain an advantage, or that the house will lose an advantage, over the long term including such factors as the size of the finite set. Some embodiments of the present invention further include using such a calculated automatic restoration point consistently such as by automatically restoring the game indicia in an electronic version, or by marking a shoe of playing cards to include a guide, e.g. a channel, groove or visual marker, to position mark a consistent automatic restoration position when the decks are restored.

In some embodiments, selecting a game indicia and/or card may include selecting a value for the card and a suit for the card. In some implementations, the value and suit may be selected separately. The value may include, for example, a face value (e.g., a two, a three, an ace, a king, a queen, etc.) The suit may include, for example, a heart, a spade, a diamond, or a club.

In some embodiments, a value may e selected with reference to an inventory of available game indicia/card or other card data. The value may be selected based on the available game indicia. For example, the value may be selected from the inventory depleted of values that have previously been selected. For example, an inventory may begin with 4 tens, but after a ten has been dealt, the inventory may have only 3 tens. Selecting a value may include using a random number generator to select a value from the remaining inventory of values, and/or any other method of selecting a value from a remaining inventory of values.

In some embodiments, the selected value, may correspond to a generic card without a suit. Unlike embodiments discussed above in which a selected card and/or indicia includes both a value and a suit, in this embodiments, the selected value does not include a suit.

In some embodiments, a suit may be selected from the four possible suits. Accordingly, in a deck, all cards of a value may have the same suit. In some implementations, a game played in this method may have outcomes that are not determined by a suit of a card. Such a game may include blackjack. The suit may be selected by a random number generator or any other method. The suit may be selected without reference to an inventory and/or card data. The suit may be selected separately from the value.

In some embodiments, the inventory or other information about card values remaining in an inventory may be displayed.

In some embodiments, after a value is selected, a number of indicia in an inventory that have the same value may be reduced and/or depleted to reflect the selection of the value. No specific card may be eliminated by such reduction in some examples, because the suit of the cards remaining is determined separately from the value. Accordingly, in some such embodiments, a deck may end up having multiple cards of the same suit even though a standard deck may not have such duplicates.

While certain embodiments of the present invention have been shown and described it is to be understood that the present invention is subject to many modifications and changes without departing from the spirit and scope of the claims presented herein.

What is claimed is:

1. A method for conducting a wagering game for a player in accordance with the rules of a base game defining a winning hand, comprising:

conducting, by a gaming device, a game hand for said player comprising:

(a) receiving a wager from said player;

(b) selecting game indicia to be dealt to said player by selecting a respective value of each indicia with reference to an available inventory of indicia and a respective suit of each indicia without reference to the available inventory of indicia;

(c) dealing the game indicia to said player, and decreasing the available inventory of indicia having a same value as each of the respective values of the indicia dealt in the game hand and indicia dealt in previous game hands, if any;

(d) conducting said game hand for said player to completion according to said base game and resolving said wager based at least in part on whether said game hand forms a winning hand;

(e) decreasing an inventory of available indicia having a same value as each of the dealt indicia and all game indicia dealt in previous game hands, if any, for play in a subsequent game hand; and (f) displaying at least one of: the available inventory of said game indicia that have been decreased in availability or winning hands eliminated as a result of said decreased availability;

conducting, by the gaming device, at least one additional sequential game hand of steps (a)-(f) using said inventory of said game indicia until a restoration event, said restoration event including at least a manual restoration event; and upon a restoration event, restoring, by the gaming device, the inventory of indicia.

2. The method of claim 1 wherein the base game includes blackjack.

3. The method of claim 1, wherein selecting game indicia to be dealt to said player includes selecting a value for each indicia based on the available inventory of indicia and selecting a suit for each indicia from the four possible suits.

4. The method of claim 1 wherein selecting game indicia to be dealt to said player includes separately selecting a value for each indicia and a suit for each indicia.

5. A method for conducting a wagering game for a player in accordance with the rules of a base game defining a winning hand, comprising:

defining, by a gaming device, a finite set of game indicia;

conducting, by the gaming device, a game hand for said player comprising:

(a) receiving a wager from said player;

(b) dealing game indicia to said player from said finite set cumulatively excluding some game indicia having a same value and a different suit as game indicia dealt in previous game hands, if any;

(c) conducting said game hand for said player to completion according to said base game and resolving said wager based at least in part on whether said game hand forms a winning hand;

(d) collecting all dealt game indicia from said player and excluding some game indicia with same values and different suits as the collected game indicia accumulated with some game indicia having same values and different suits as game indicia dealt in previous game hands, if any, from play in a subsequent game hand; and (e) displaying at least one of: the inventory of said game indicia from said finite set cumulatively excluding some game indicia having a same value and different suit as all game indicia dealt in previous game hands or winning hands eliminated as a result of said excluded game indicia;

conducting, by the gaming device, at least one additional sequential game hand of steps (a)-(e) using said finite set cumulatively excluding game indicia have a same value and a different suit as dealt game indicia until a restoration event, said restoration event including at least a manual restoration event; and upon a restoration event, restoring, by the gaming device, excluded game indicia to said finite set.

6. The method of claim 5 wherein the base game includes blackjack.

7. The method of claim 5 wherein the base game includes a game in which a suit of an indicia is not relevant to an outcome.

8. The method of claim 5, wherein excluding some game indicia with same values and different suits as the collected game indicia includes excluding a single game indicia with a same value and a different suit as the collected game indicia for each collected game indicia.

9. The method of claim 5, wherein cumulatively excluding some game indicia having a same value and a different suit as game indicia dealt in previous game hand includes excluding a single game indicia having the same value and the different suit as the game indicia dealt in the previous game hand for each game indicia dealt in the previous game hand.

10. A method for conducting a wagering game for a player in accordance with the rules of a base game defining a winning hand, comprising:

conducting, by a gaming device, a plurality of simultaneous game hands for said player comprising:

(a) receiving a wager for each game hand from said player;

(b) selecting game indicia to be dealt to said plurality of game hands by selecting a respective value of each indicia with reference to an available inventory of indicia and a respective suit of each indicia without reference to the available inventory of indicia;

(c) dealing the selected game indicia to said plurality of game hands;

(d) conducting each said game hand for said player to completion according to said base game and determining whether said game hand forms a winning hand;

(e) decreasing an inventory of available indicia having a same value as each of the dealt indicia and all game indicia previously dealt from play in another game hand; and (f) after each game hand is completed, displaying at least one of: the inventory of said game indicia that have been decreased in availability or winning hands eliminated as a result of said decreased availability; and after said plurality of simultaneous hands have all been completed, resolving, by the gaming device, said wager and restoring the inventory of indicia.

11. The method of claim 10 wherein the base game includes blackjack.

12. The method of claim 10, wherein selecting game indicia to be dealt to said plurality of game hands includes selecting a value for each indicia based on the available inventory of indicia and selecting a suit for each indicia from the four possible suits.

13. The method of claim 10 wherein selecting game indicia to be dealt to said plurality if game hands includes separately selecting a value for each indicia and a suit for each indicia.

14. A method for conducting a wagering game for a player in accordance with the rules of a base game defining a winning hand, comprising:

defining, by a gaming device, a finite set of game indicia and ordering said finite set;

conducting, by the gaming device, a plurality of simultaneous game hands for said player comprising:

(a) receiving a wager for each game hand from said player;

(b) dealing game indicia to said plurality of game hands from said finite set cumulatively excluding some game indicia having a same value and a different suit as game indicia previously dealt;

(c) conducting each said game hand for said player to completion according to said base game and determining whether said game hand forms a winning hand;

(d) after each game hand is completed, excluding some game indicia with same values and different suits as the dealt game indicia accumulated with some game indicia having same values and different suits as game indicia previously dealt from play in another game hand; and (e) after each game hand is completed, displaying at least one of: the inventory of said game indicia from said finite set cumulatively excluding some game indicia having a same value and different suit as all game indicia previously dealt or winning hands eliminated as a result of said excluded game indicia; and after said plurality of simultaneous hands have all been completed, resolving, by the gaming device, said wager and restoring excluded game indicia to said finite set.

15. The method of claim 14 wherein the base game includes blackjack.

16. The method of claim 14 wherein the base game includes a game in which a suit of an indicia is not relevant to an outcome.

17. The method of claim 14, wherein excluding some game indicia with same values and different suits all game indicia previously dealt includes excluding a single game indicia with a same value and a different suit as the previously dealt game indicia for each previously dealt game indicia.

18. The method of claim 14, wherein cumulatively excluding some game indicia having a same value and a different suit as game indicia previously dealt includes excluding a single game indicia having the same value and the different suit as the game indicia previously dealt for each game indicia previously dealt.

* * * * *